UNITED STATES PATENT OFFICE.

WALTER JOHN MICHELS, OF STAMFORD, CONNECTICUT.

PLASTIC COMPOSITION FOR WALL-HANGINGS, &c.

SPECIFICATION forming part of Letters Patent No. 355,776, dated January 11, 1887.

Application filed October 25, 1886. Serial No. 217,141. (No specimens.)

*To all whom it may concern:*

Be it known that I, WALTER JOHN MICHELS, a subject of the Queen of Great Britain, residing in the town of Stamford, State of Connecticut, have invented certain new and useful Improvements in Plastic Compositions for Embossed Wall-Hangings, Water-Proof Cloths, Floor-Cloths, Signs, &c., of which the following is a full, clear, and exact description of the invention, such as will enable others skilled in the art to which it appertains to make and use the same.

My composition consists of the following ingredients combined in the proportions stated: I take a vegetable oil, (I prefer castor-oil, or a combination of castor-oil and cotton-seed oil,) which I boil for about four hours at a temperature of 450° to 500° Fahrenheit, after which I add kauri gum, resin, camphor gum, and sometimes a suitable drier. When these ingredients are well combined, the composition is cooled down to about 300° Fahrenheit, after which flowers of sulphur is added, and the temperature of the composition raised slowly to about 360° to 400° Fahrenheit, and kept at said heat till the same is vulcanized.

The proportions of ingredients of the above composition, to work well, should be castor-oil, or a combination of castor-oil and cotton-seed oil, one hundred pounds; kauri gum, twenty-five pounds; resin, six pounds; camphor-gum, one and one-half pound, and flowers of sulphur, twenty-five pounds.

I take one hundred pounds of the above composition, one hundred pounds of wood pulp or any analogous material, and one pound paraffine wax, and combine them in a mixer. The complete composition is then spread on a backing of paper or other suitable material embossed or otherwise treated by well-known machinery used for that purpose and dried by exposure to the air.

What I claim, and desire to secure by Letters Patent of the United States, is—

1. The composition herein described, consisting of a vegetable oil, kauri gum, resin, camphor gum, flowers of sulphur, wood pulp, and paraffine, in the proportions specified.

2. A vulcanized composition of matter composed of boiled vegetable oil, kauri gum, resin, camphor gum, and flowers of sulphur, in the proportions specified.

3. A composition composed of vegetable oil, kauri gum, resin, camphor gum, and flowers of sulphur, in the proportions specified.

WALTER JOHN MICHELS.

Witnesses:
WILLIAM P. MITCHELL,
WM. CALLAHAN.